United States Patent

Robinson

[15] 3,666,801

[45] May 30, 1972

[54] 4-TERT-BUTYLPHENYLHYDRAZONES OF PYRUVIC ACIDS

[72] Inventor: Richard A. Robinson, Evanston, Ill.

[73] Assignee: G. D. Searle & Co., Chicago, Ill.

[22] Filed: Aug. 8, 1969

[21] Appl. No.: 848,704

[52] U.S. Cl. ................... 260/518 R, 260/471 A, 260/518 A, 260/519, 424/319
[51] Int. Cl. ....................................................... C07c 109/12
[58] Field of Search ........................... 260/518 A, 518 R, 519

[56] References Cited

OTHER PUBLICATIONS

Prelog et al.; Helv. Chim, ACTA, Vol. 31, pages 1178–1182 Relied on; (1948), Qa1C4J5

Primary Examiner—Lorraine A. Weinberger
Assistant Examiner—L. Arnold Thaxton
Attorney—John M. Brown, John J. Kolano, Elliot N. Schubert, Walter C. Ramm and Helmuth A. Wegner

[57] ABSTRACT

Hydrazones of pyruvic acid and substituted pyruvic acids with 4-tert-butylphenylhydrazine are described herein. They are anti-inflammatory agents. Hydrolysis of the appropriate ester gives the present acids and the esters are prepared by the reaction of the appropriate pyruvate with 4-tert-butylphenylhydrazine or by reaction of the appropriate substituted acetoacetic ester with 4-tert-butylbenzenediazonium chloride.

4 Claims, No Drawings

4-TERT-BUTYLPHENYLHYDRAZONES OF PYRUVIC ACIDS

The present invention relates to a group of hydrazones of pyruvic acids. In particular it relates to 4-tert-butylphenylhydrazones having the following general formula

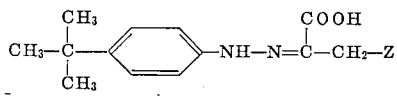

wherein Z is selected from the group consisting of hydrogen, ethynyl, phenyl, halophenyl, alkylphenyl, and methoxyphenyl. The halophenyl radicals referred to above include fluorophenyl, chlorophenyl, bromophenyl, and iodophenyl. In the alkylphenyl radicals referred to above, the alkyl portion is lower alkyl containing up to six carbon atoms and it can be exemplified by groups such as methyl, ethyl, propyl, isopropyl, butyl, and tert-butyl.

Several methods are available for the preparation of the compounds of the present invention. Thus, an ester of pyruvic acid, preferably the ethyl ester, can be reacted with 4-tert-butylphenylhydrazine to give an ester of the following type

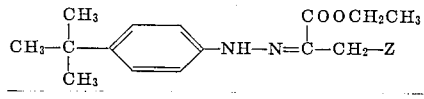

wherein Z is defined as above. Hydrolysis of this ester under alkaline conditions then gives the desired pyruvic acid.

Alternately, the present compounds can be prepared by starting from an appropriate acetoacetic ester of the formula

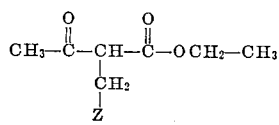

wherein Z is defined as above. This ester is reacted with 4-tert-butylbenzenediazonium chloride under alkaline conditions in a Japp-Klingemann reaction to give an azo compound having the following formula

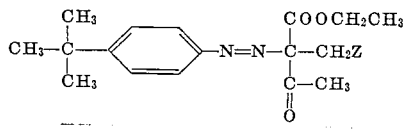

wherein Z is defined as above. Alkaline hydrolysis of this product removes the acetyl group, hydrolyzes the ester linkage and causes rearrangement of the azo compound to the hydrazo compound to give the desired products. The diazotization described above occassionally takes place with elimination of the acetyl group and rearrangement to the hydrazone so that it is then necessary only to hydrolyze the ester group to give the desired product. However, with the present compounds, the azo compound is the usual intermediate. It is ordinarily not necessary to purify this material before proceeding into the hydrolysis step.

The compounds of this invention are useful because of their valuable pharmacological properties. Thus, for example, like phenylbutazone, they counteract the edema and granuloma formation characteristic of the inflammatory response to tissue insult.

The anti-inflammatory utility of the present compounds is evident from the results of a standardized test for their capacity to inhibit the formation of granuloma tissue induced in adrenalectomized rats by implanted cotton. The procedure is a modification of one described by Dulin in Proc. Soc. Exp. Biol. Med., 90, 155 (1955). Male Sprague-Dawley rats weighing 180–200 grams are adrenalectomized, and their drinking water is thereafter replaced by aqueous 0.86 percent sodium chloride supplemented during the first 24 hours by glucose q.s. 5 percent. On the day after the adrenalectomy, 4 pellets of dental cotton averaging approximately 6 mg. apiece are separately, subcutaneously, and bilaterally implanted in the pectoral and dorsal lateral neck region of each animal, whereupon the prescribed dose of compound to be tested, dissolved or suspended in a vehicle consisting of a mixture of 20 ml. of aqueous 0.86 percent saline with one drop of polysorbate 80, is administered intragastrically to each of six animals. A like group of animals to which is identically and concurrently administered vehicle alone serves as controls. This treatment is repeated the next day. The day after that, the animals are sacrificed and the pellets, with associated granuloma tissue, are dissected, dried, and weighed. A compound is considered anti-inflammatory if the mean weight of granuloma tissue in the group of animals treated therewith, adjusted to compensate for variations in dissection technique, is significantly less than the corresponding weight in the control group.

The following examples describe compounds illustrative of the present invention and methods which have been devised for the preparation thereof. Throughout the examples hereinafter set forth, temperatures are given in degrees centigrade (°C.) and relative amounts of materials in parts by weight, except as otherwise noted.

EXAMPLE 1

A mixture of 185.5 parts of 4-tert-butylaniline hydrochloride, 190 parts of concentrated hydrochloric acid, and 200 parts of water is cooled to −8° to −10° C. To this mixture there is added portionwise, over a period of 90 minutes, an aqueous solution of 70 parts of sodium nitrite while maintaining the mixture at ice bath temperature. The solid amine hydrochloride present at the start of the reaction dissolves to give an orange solution by the time addition of the sodium nitrite is complete. The resulting solution is then filtered to remove a small amount of insoluble material.

The cold diazo solution is then added portionwise, over a period of 60 minutes, to a mixture of 500 parts of stannous chloride dihydrate, 480 parts of concentrated hydrochloric acid, and 1000 parts of water at −10° to −12°C. A heavy white crystalline precipitate forms. The mixture is allowed to warm to 25° C. over a period of 2 hours and then heated to raise the temperature to 80°–90° C. The mixture is then stirred at this temperature for 3 hours and finally allowed to cool. It is then further cooled in an ice bath and the crystalline mass which forms is separated by filtration and washed with dilute aqueous hydrochloric acid. The product obtained in this way is 4-tert-butylphenylhydrazine hydrochloride which sublimes without melting at about 270° C. The corresponding free hydrazine melts at about 80° C.

EXAMPLE 2

A solution is prepared by adding 20 parts of 4-tert-butylphenylhydrazine hydrochloride, with stirring, to 150 parts of water at 25° C. To this solution is added 15 parts of ethyl pyruvate all at once. Then, 8 parts of sodium acetate is added and the mixture is stirred for 90 minutes. The crystalline precipitate which forms is separated by filtration and washed with cold water and 2-propanol to give ethyl pyruvate 4-tert-butylphenylhydrazone. The crude hydrazone is then hydrolyzed by adding it to 5 parts of sodium hydroxide in aqueous ethanol at 25° C. The mixture is stirred for about 2 hours until solution takes place and it is then acidified by adding dilute hydrochloric acid. The precipitate which forms is separated by filtration and recrystallized from 2-propanol to give pyruvic acid 4-tert-butylphenylhydrazone melting at about 163° C. This compound has the following formula

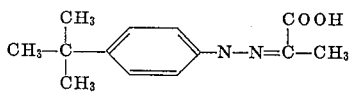

EXAMPLE 3

The procedure of Example 2 is repeated using an equivalent quantity of ethyl phenylpyruvate in place of the ethyl pyruvate. In this case, the product is phenylpyruvic acid 4-tert-butylphenylhydrazone.

EXAMPLE 4

To a mixture of 18.5 parts of 4-tert-butylaniline hydrochloride, 10 parts of concentrated hydrochloric acid, and 100 parts of water there is added portionwise an aqueous solution of 7 parts of sodium nitrite while the temperature is maintained at −5° to −10° C. The diazo solution obtained in this way is added, at −10° C., to 17 parts of ethyl 2-propargylacetoacetate in an aqueous solution which has been made neutral to Congo Red. The mixture is then stirred for 30 minutes and made alkaline by the portionwise addition of dilute aqueous sodium hydroxide at −10° C. The mixture is then extracted with ether and the ether extract is separated and dried and the solvent is removed to leave an oily residue. The residue is mixed with an aqueous ethanolic solution of 10 parts of sodium hydroxide at room temperature for about 2 hours until solution takes place. The solution is then acidified with dilute hydrochloric acid and the precipitate which forms is separated by filtration and recrystallized from 2-propanol to give ethynylpyruvic acid 4-tert-butylphenylhydrazone melting at about 184° C. This compound has the following formula

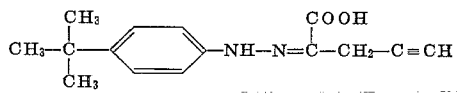

EXAMPLE 5

The procedure of Example 4 is repeated using an equivalent quantity of ethyl 2-(4-tert-butylbenzyl)acetoacetate in place of the ethyl 2-propargylacetoacetate. In this case, the product is 4-tert-butylphenylpyruvic acid 4-tert-butylphenylhydrazone melting at about 163° C. after recrystallization from 2-propanol. The ester starting material is obtained from ethyl acetoacetate and 4-tert-butylbenzyl chloride by the method of Falco et al., J. Am. Chem. Soc., 73, 3758 (1951).

Similarly, the diazonium chloride from 4-tert-butylaniline is reacted with ethyl 2-(3-methylbenzyl)acetoacetate and the resulting ester is hydrolyzed under alkaline conditions to give 3-tolylpyruvic acid 4-tert-butylphenylhydrazone.

EXAMPLE 6

4-Tert-Butylbenzenediazonium chloride is reacted with ethyl 2-(4-chlorobenzyl)acetoacetate according to the procedure described in Example 4 to give 4-chlorophenylpyruvic acid 4-tert-butylphenylhydrazone melting at about 150° C. after recrystallization from 2-propanol.

If the above procedure is repeated using ethyl 2-(4-bromobenzyl)acetoacetate, the product is 4-bromophenylpyruvic acid 4-tert-butylphenylhydrazone.

EXAMPLE 7

The procedure of Example 4 is repeated using 4-tert-butylbenzenediazonium chloride and ethyl 2-(4-methoxybenzyl)acetoacetate. In this case, the product is 4-methoxyphenylpyruvic acid 4-tert-butylphenylhydrazone melting at about 134° C. after recrystallization from 2-propanol.

What is claimed is:

1. A compound of the formula

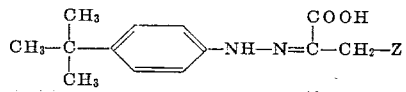

wherein Z is selected from the group consisting of hydrogen, ethynyl, phenyl, halophenyl, (lower alkyl) phenyl, and methoxyphenyl.

2. A compound according to claim 1 which is pyruvic acid 4-tert-butylphenylhydrazone.

3. A compound according to claim 1 which is phenylpyruvic acid 4-tert-butylphenylhydrazone.

4. A compound according to claim 1 which is 4-chlorophenylpyruvic acid 4-tert-butylphenylhydrazone.

* * * * *